Dec. 26, 1967  W. A. RUTLEDGE ET AL  3,359,628
METHOD OF PRODUCING MACHINES HAVING PROPER FREEDOM
OF REVOLUTION FOR ROTATABLE ASSEMBLIES THEREIN
Filed Oct. 22, 1965  3 Sheets-Sheet 1
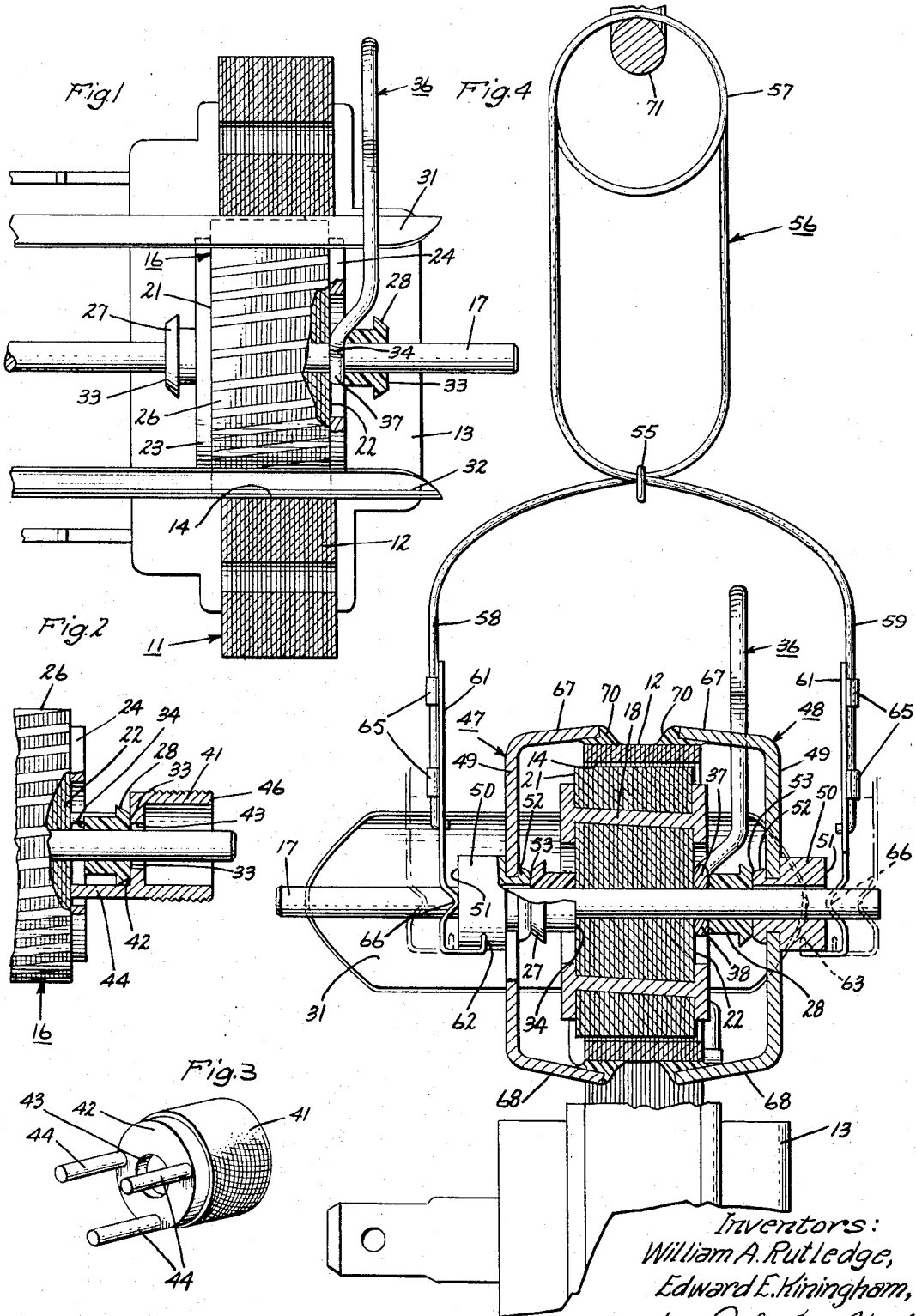
Inventors:
William A. Rutledge,
Edward E. Kiningham,
by John M. Stoudt
Attorney.

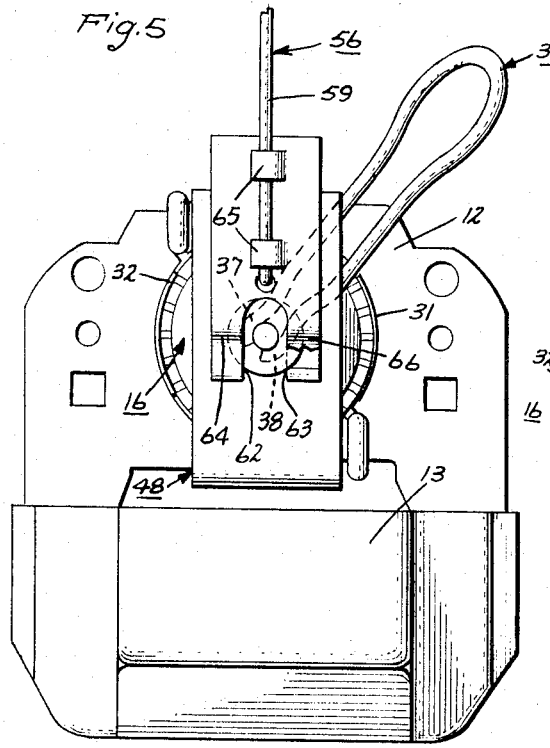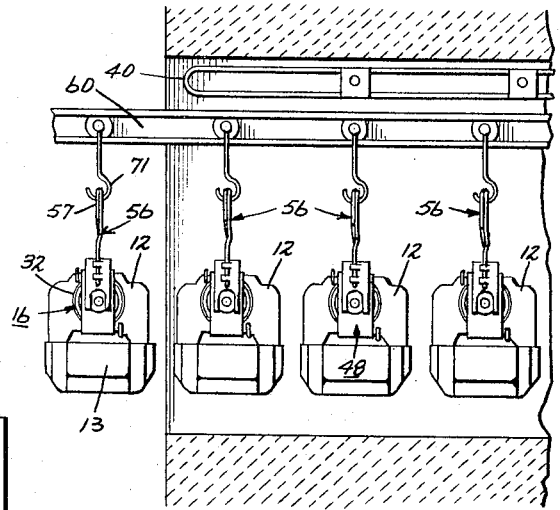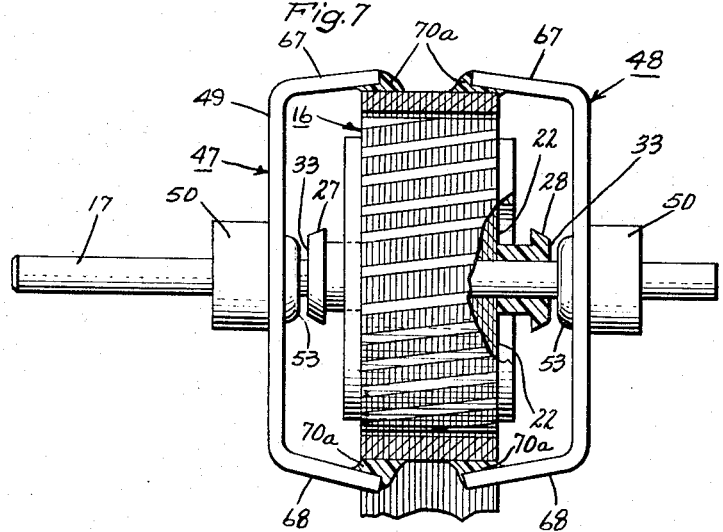

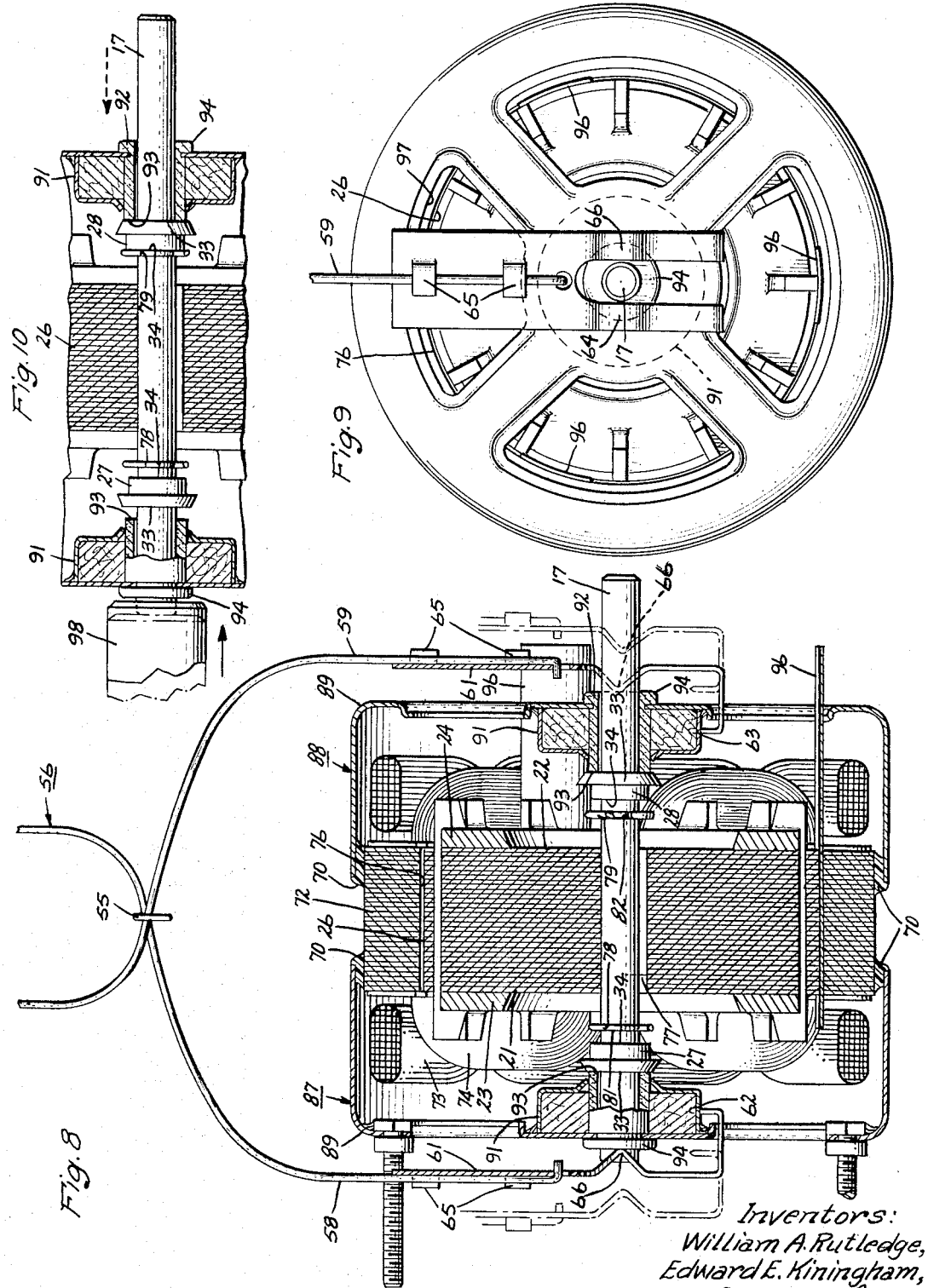

United States Patent Office 3,359,628
Patented Dec. 26, 1967

3,359,628
METHOD OF PRODUCING MACHINES HAVING PROPER FREEDOM OF REVOLUTION FOR ROTATABLE ASSEMBLIES THEREIN
William A. Rutledge and Edward E. Kiningham, Fort Wayne, Ind., assignors to General Electric Company, a corporation of New York
Filed Oct. 22, 1965, Ser. No. 500,875
6 Claims. (Cl. 29—596)

This invention relates to the manufacture of machines having rotatable components and, in particular, to an improved method of fabricating machines especially fractional horsepower electric motors having sleeve type bearings, with a desired total axial movement of the rotatable assembly and with proper alignment of the bearings and shaft components In machines having a rotatable assembly revolvably supported by bearings, such as dynamoelectric machines, it is extremely important, if not essential, that the total permissible axial movement or so-called "end play" of the rotatable assembly be provided within preselected or predescribed limits. These machines normally include a thrust transmitting system for restricting the varying axial thrust or axial oscillation of the rotatable assembly during operation of the machine as might result, for instance, from the load being driven and the rotor. By way of illustration, in small and fractional horsepower motors constructed with a motor assembly having the shaft journalled on either side of the rotor core by sleeve type bearings, a thrust surface may be provided next to each side face of the rotor core to transmit the varying axial thrust to an associated stationary thrust receiving surface. Excessive end play for a given machine construction and application may not only produce an unusually high level of noise during operation, but more significantly from the viewpoint of performance, tends to interfere with proper revolution of the rotatable assembly. If the impact forces on the force transmitting thrust surfaces resulting from excessive axial movement of the rotatable assembly become unduly high, they may damage the thrust system thereby rendering the machine inoperative. Further, an improper neutral position of the rotor assembly relative to the stator of the machine could adversely affect the axial air gap force of the machine and tend to overload the thrust system in a particular direction.

Interference with the proper revolution of the rotatable assembly in the machine may also result from the type of journal support for the rotatable assembly provided by the bearings. The slightest angular variation, either in a coaxial relation between each internal bearing surface which journals the shaft on either side of the rotor core or in a true parallel relation between these internal bearing surfaces, may produce a cocking of the shaft and bearings relative to one another. This condition, in turn, creates interference with the freedom of the shaft rotation and if of sufficient magnitude, may prevent rotation of the rotatable assembly, commonly referred to as a "frozen shaft" or locked rotor condition.

The proper end play and freedom of revolution of the rotatable assembly is particularly troublesome and difficult to attain with any degree of consistency and control by an economical procedure in the mass production manufacture of fractional horsepower electric motors which incorporate usually lightweight end frames, e.g., a fraction of a pound each, mounting the sleeve type bearings. The motors disclosed in M. D. Tupper's Patents 3,024,377 and 3,145,313 respectively granted on Mar. 6, 1962 and Aug. 18, 1964 are representative of such construction.

Consequently, it is an object of the present invention to provide an improved yet inexpensive method of fabricating machines having a rotatable assembly and providing such machines with the desired total end play.

It is another object of the present invention to provide an improved method of manufacturing dynamoelectric machines, especially small and fractional horsepower motors which overcomes the difficulties mentioned above while furnishing the desired end play for the rotatable assembly and the proper bearing alignment.

It is still another object of the present invention to provide an improved method of fabricating small and fractional horsepower electric motors which is not only particularly suitable for use in the mass production manufacture of motors having light weight end frames supporting sleeve type bearings, but also provides a preselected end play for the rotatable assembly, consistent from one motor to the other, and concurrently attains the desired alignment of the bearings and shaft in spite of the low weight of the end frames.

In carrying out the method of the present invention in one form, we provide a method of attaining the desired bearing alignment and proper end play of the rotatable assembly in a machine during its manufacture, especially significant in the manufacture of fractional horsepower electric motors having a pair of light weight end frame members mounting sleeve type bearings. Considering the production of such motors, initially, the stator of the motor and the core of the rotatable assembly secured to revolve with a shaft, are fastened together in a fixed relation to define an air gap of predetermined dimensions therebetween. In addition, a thrust transmitting wall is disposed facing away from the side face of the rotatable core in spaced relation therewith at a first preselected axial position relative to the core.

Journal bearing means including a sleeve type bearing mounted to an end frame member, formed of sheet metal material, is then slid onto the shaft and biased toward the associated thrust transmitting wall. When in place, the journal bearing means together support the combined weight of the stator and rotatable assembly. At the same time, these means are in turn pivotally supported for slight angular movement in two separate directions; i.e., vertically in a plane parallel to and extending through the axis of the shaft and in a transverse direction normal to the shaft axis. Thus, the bores of the journal bearing means will be caused by the combined supported weight of the stator and rotatable assembly to move into alignment with the highly finished journals of the shaft and the journal will be held against the bore for its length by the combined weight after the bearings become aligned.

The end frame members are then individually secured to the stator as (1) the bearings continue to carry the combined weight of the stator and rotatable assembly, (2) the journal bearing means are still biased in the aforedescribed manner, and (3) the thrust transmitting walls are maintained at the first preselected axial positions. Once this is accomplished, the stator and rotatable assembly are released for relative rotation, the bias on the end frames removed, and at least one of the thrust transmitting walls is transferred to a second preselected position located nearer the rotatable core than the first position.

Among other beneficial features ensuing from the present invention, the bearings and shaft are aligned with the desired co-axial relation and the proper end play built into the motor. These features may be attained with a high degree of consistency in the mass production manufacture of the motors in spite of the economics involved in the practice of the invention.

The subject matter which we regard as our invention is particularly pointed out and distinctly claimed in the concluding portion of this specification. Our invention, itself, however, both as to its organization and method of operation, together with further objects and advantages thereof may best be understood by reference to the following description taken in connection with the accompanying drawings.

In the drawings:

FIGURE 1 is a plan view, partly in section and partly broken away of the electric motor rotor and stator assemblies of the exemplification being held together in a temporarily fixed preselected relation, with an initial axial spacing equivalent to the total desired rotor assembly end play being provided between one side face of the rotor core and and adjacent thrust bearing member;

FIGURE 2 is a plan view, partly in section and partly broken away of a portion of the rotor assembly shown in FIGURE 1 to reveal an alternate means for establishing the desired initial axial spacing between the side face of the rotor core and associated thrust bearing member;

FIGURE 3 is a perspective view of the means employed in FIGURE 2 to achieve the desired axial spacing;

FIGURE 4 is a side elevational view, partially in section and partially broken away, illustrating certain components of the motor of the exemplification assembled together, with the motor end frames being biased toward each other by an assembly fixture as the end frame mounted sleeve bearings support the weight of the other motor components while the bearings become aligned;

FIGURE 5 is an end view of the motor components and assembly fixture illustrated in FIGURE 4 seen from the right side of FIGURE 4;

FIGURE 6 is a view partly in cross-section of motors assembled by one embodiment of the present invention being transported through an oven to harden the adhesive material which in the motor of the exemplification is utilized to secure the end frames and the stator core firmly together;

FIGURE 7 is a partial side elevational view, partly in section of the electric motor of the exemplification after it has been fabricated by the method of the present invention and furnished with the desired total axial end play for the rotor assembly;

FIGURES 8, 9, and 10 illustrate another type of electric motor being fabricated by the present invention wherein FIGURE 8 is a side elevational view of the assembly fixture and electric motor components after the desired total end play has been established for the motor;

FIGURE 9 is an end view of the motor and fixture assembly seen from the right side of FIGURE 8; and FIGURE 10 is a partial view of certain motor components shown in FIGURE 8, showing the right thrust bearing in the figure being located in a final position on the shaft.

Turning now to the drawings in more detail and in particular to FIGURES 1–7 inclusive, for purposes of explanation, one form of the present invention has been illustrated in connection with the fabrication of an alternating current, single phase, fractional horsepower shaded pole electric motor of the type disclosed in the Tupper Patent No. 3,024,377 issued Mar. 6, 1962. In the exemplification, the stationary assembly is a stator 11 having a laminated core fabricated of magnetic material and includes a generally U-shaped yoke section 12 and a bridging laminated core section which supports a winding coil sub-assembly 13 having an adherent coating in accordance with the H. C. Kaeding Patent 3,196,297. The yoke section has its bight portion formed with an axial bore 14 for receiving the rotor 16 of a rotatable assembly having a shaft 17 mounting a laminated magnetic core of rotor 16. The rotor core is provided with a conventional cast squirrel-cage secondary winding formed by a number of angularly spaced apart conductor bars 18 carried by the rotor core which are electrically joined together on opposite end faces 21, 22 of the rotor core by continuous end rings 23, 24 spaced radially outward from the outer periphery of shaft 17.

As shown in FIGURE 1, initially the stator 11 and the rotatable assembly are fastened in a predetermined spaced relation to provide a fixed air gap of the desired dimensions between stator bore 14 and outer cylindrical rotor surface 26 and a pair of thrust transmitting members 27, 28 are placed on shaft 17 at preselected axial locations relative to the associated side or end faces 21, 22. In particular, the air gap may be established by any inexpensive equipment, such as suitable clamps engaging the stator and rotatable assembly at appropriate locations or suitable diametrically disposed gauges 31, 32 fabricated of spring steel or the like situated in the air gap in the illustrated fashion. Preferably, the air gap is furnished with a generally uniform cross-section for its axial length.

With respect to the two illustrated thrust transmitting members, each is identical in construction, being molded of plastic material, such as nylon, to provide a radial thrust transmitting wall 33 and a central aperture dimensioned for a snug or interference fit with the shaft. For those situations where there are no positive stops at the final axial position (to be considered below) the fit should be such that it is capable of preventing relative movement between the member and shaft in response to the maximum thrust loads which the members will experience during operation or high loads resulting from shipping. Other factors affecting the type of fit are discussed hereinafter. As best seen in FIGURE 4, the hub section of member 27 has its radial termination 34 forced into engagement with the associated end face 21 of the rotor core while the similar termination of member 28 is positioned in axially spaced relation with rotor core face 22. This space, as will become more apparent hereinafter, is dimensionally equal to the total axial end play desired for the motor and may be established in any convenient fashion. For example, a generally U-shaped spring clamp 36 having a spring bight section biasing leg sections 37, 38 toward one another may be employed between end face 22 and termination 34 of members 28 as shown in FIGURES 1, 4, and 5. The leg sections are accurately dimensioned in cross-section to correspond with the desired total end play, the legs being separated against the action of the spring bight section when assembled into position on the shaft.

FIGURES 2 and 3 illustrate an alternate means for establishing the desired initial axial spacing between the rotor end face 22 and thrust member 28, especially useful where the end face is substantially normal to the axis of the shaft and the fit between the member and the shaft is unusually tight. This means comprises an element having a generally cylindrical head 41 formed with a radial end surface 42 for engagement with wall 33 of the thrust member and a central hole 43 for receiving shaft 27. These angularly spaced projections 44 extend away from the end surface 42 for an axial length equal to the sum of the desired total end play and axial length of member 28 which fits within the confines defined by the three projections. With this arrangement, thrust member 28 may be driven onto shaft 17 to the proper axial position by applying sufficient force to end 46 of head 41, as by impact blows from a rubber mallet or the like (not illustrated). This element may then be entirely removed for subsequent assembly steps.

Returning now to a consideration of the fabrication steps employing spring clamp 36 and in particular to FIGURES 4 and 5, once the proper axial spacing of thrust members 27, 28 relative to the rotor core or shaft has been accomplished, the end frames, denoted generally by numerals 47, 48, are assembled onto the shaft. In the illustrated form, each end frame is light in weight; e.g., less than an ounce, and is identically formed by a generally U-shaped bracket 49 stamped out of sheet material, such as aluminum or other non-magnetic, material, having its bight section mounting a journal or sleeve type bearing 50 formed with an axial bore for rotatably supporting the shaft journal. The inboard side of the bearing 50 extends through a suitable opening in the bracket bight portion and is staked thereto as indicated at 52. The terminal end of the inboard bearing side is located intermediate the legs of the bracket and defines a radial thrust receiving wall 53 facing the thrust transmitting wall of members 27, 28 for receiving the thrust load in each direction from these members.

After the bearings have each been slid onto the shaft and the thrust receiving surfaces 53 provided by the bearings placed into engagement with the thrust walls 33 of members 27, 28, the engaging walls are maintained against one another in the manner shown by FIGURE 4 and the alignment of the bearings and shaft achieved. This alignment, in view of the light weight of the end frame members, is obtained by pivotally supporting each end frame individually in two directions as the bearings mounted by the end frames in turn support the stator, rotatable asembly, and shims through cooperating bearing bores and journals of the shaft. The pivotal support of each end frame is such that the bearings are free to pivot or turn through a vertical plane preferably extending through the axis of the shaft, with the pivot preferably being generally at the rotational axis of the shaft. In addition, the en dframes turn around a pivot in a transverse plane generally normal to the shaft axis, with the pivot again being generally in line with the axis. Consequently, the combined weight of the motor components as well as the shims are used to obtain the desired coaxial relation between the bearing bores and between the individual bores and shaft journal. At the same time, adjacent thrust walls 33, 53 are biased into engagement so that the total end play already established between thrust member 28 and side face 22 of the rotor core will not change.

An end frame supporting fixture, such as that indicated by numeral 56 in FIGURES 4 and 5, may be used in the practice of our invention to attain the foregoing relationships. The illustrated supporting fixture has an upper coil spring section 57 which crosses over at washer 55 and biases depending legs 58, 59 toward one another with a predetermined force. Each leg pivotally mounts a somewhat J-shaped bracket 61 at pivots 65 for pivotal movement around a pivot in a transverse plane generally normal to and extending through the axis of shaft 17. Bracket 61 also includes a bifurcated end formed with upstanding spaced apart knife edges 62, 63 which in turn engage the outer bottom periphery of each bearing 50 to support the bearing at two spaced apart locations. A pair of radially spaced apart indentations 64, 66 located on either side of the shaft axis contact the outboard side 51 of each bearing to assist in pivotal support of the bearing, with the knife edges 62, 63 serving as the pivots for movement of the center of the bearing bore in the vertical plane extending through the axis of the shaft.

From the above, it will be seen that even though the end frames may be relatively light in weight the establishment of the critical area of journal contact between the bearing bores and the associated shaft journals is insured, permitting some latitude and simplicity in handling of the motor during its assembly. For example, the following motor components having the tabulated masses and dimensions show how effective the present invention can be in spite of the small size of the components and the unusually light weights involved:

Component: Size and/or Weight
   End frames 47, 48 _____ounce__ 0.25
      Bearing bore sizes (I.D.)
         inch__ 0.12515/0.02535
      Bearing bore length _____inch__ 0.20
   Rotatable assembly including ½ inch core
     (stack) and shaft _____ounces__ 1.66
   Stator 12 (½ inch stack) _____do____ 10.2

Thus, the two end frames will support a combined motor component weight of 11.88 ounces divided between end frames 47, 48 as well as at least the weight of the two sims (0.14 ounce) as the alignment is being derived. If additional weight is desired, compensating weights (not shown) may be temporarily added to the stator and rotatable assembly unit. Further, although the axis of the shaft has been illustrated as being horizontal, it could, of course, be supported by end frames 47, 48 at a slight angle relative to the horizontal so long as the angle is chosen to allow the proper establishment of the area of journal contact as the bearing bores primarily support the weight of the motor components, including the shaft, among other considerations.

In order to insure the desired alignment of the parts previously discussed, the end frames of the exemplification should have their bracket flanges 67, 68 overlapping the yoke section of the stator in spaced relation therewith. In addition, we prefer to employ unhardened material 70 which is sufficiently elastic and fluid in its unhardened state to allow the desired pivotal movement of the individual end frames with respect to the shaft and stator during the attainment of the alignment. This material is preferably of the type discussed in the Thompson et al. Patent 3,165,816, issued Jan. 19, 1965 and the Rutledge Patent 3,195,222, issued July 20, 1965. Briefly stated, the illustrated material is substantially non-shrinking between the unhardened and hardened state so that stress will not be introduced which would adversely affect the alignment and other established relationships of the parts. A thermosetting organic epoxy resin tending to be thixotropic in nature is one of many materials which has the desired properties. It should be recognized that without departing from all inventions the unhardened material 70 may be applied to either or both of the adjacent surfaces of the stator and end frames before assembly of the end frames onto the shaft or after the components have been disposed in the loosely assembled relation shown in FIGURE 4. Further, although the stator does not include a central shell or frame, the term "stationary assembly" as used in here is intended to cover this construction as well as other obvious structure modifications.

With the parts in assembled relations shown by FIGURES 4 and 5, it is convenient to remove clamp 36 from the location shown in FIGURES 4 and 5 thereafter and harden or cure material 70 to the point wherein it becomes sufficiently hard (numeral 70a in FIGURE 7 to retain the end frames 47, 48 in a fixed and permanent relationship relative to the stator 12. Any suitable means may be employed, such as by the application of a controlled heat from oven 40 in FIGURE 6. To effect the hardening step, the motor components and fixture 56 may be transported through the assembly procedure shown in FIGURE 4 by a conveyor 60 having a number of depending hooks 71 which removably project through the coil spring 57 portion of the support fixture 56 for carrying the assembled components. Thus, during the application of heat, as the conveyor transports the motors through the oven at a regulated rate, the already established component relationship will be maintained as the adhesive material 70 hardens. Of course, any curing means may be utilized in the motor of the exemplification, such as by the inclusion of a sufficient amount of hardener to set it up at room temeprature in a given length of time. After the hardening step, shims may be removed from the air gap to free the rotatable assembly for relative rotation with regard to the stator 12 and end frames 47, 48.

Finally, the axial position of thrust member 28 is changed to that it, too, has its termination 34 in abutting relation with the adjacent end faces 22 of the motor in the way seen in FIGURE 7. This change of location for thrust transmitting member 28 may be obtained by a slight impact force applied directly to the right end of shaft 17 as viewed in FIGURE 7. Member 28 will be retained against axial movement by stationary thrust receiving wall 53 of end frame 48 as the shaft is being moved relative to member 28. The applied force must be sufficiently great to overcome the tight engagement between the thrust member 28 and the shaft thereby effecting the relative movement between the two parts.

Since the total end play was established on the right side of the motor, as viewed in the drawings, it is preferable to place the rotor 16 slightly off axial center the stator bore in the manner shown by FIGURES 1 and 4 so that after the shims have been removed from the air gap and one half of the end play provided on either side of the motor as revealed by FIGURE 7, the rotor 16 will be normally centered within the rotor receiving bore of the stator 12.

It will be readily manifest from the foregoing that the method of the present invention is capable of providing a preselected end play in the motor and at the same time produces accurate coaxial alignment of the bearing bores with each other as well as individually with the journal of the shaft which they support. Concurrently, it is possible to provide a controlled air gap between the rotor and stator. In spite of the light weight of end frames which the motor may incorporate, the above-mentioned alignment is obtained automatically without necessitating the employment of expensive equipment of time consuming labor and the process is especially suitable for use in a mass production manufacture of machines to provide a minimum variance in quality between the machines at a relatively low unit cost.

Referring now to FIGURES 8, 9, and 10 in which similar parts to those in FIGURES 1–7 inclusive are identified by like reference numerals, the present invention is revealed in connection with the manufacture of a fractional horsepower electric motor having a conventional stator 72 constructed with a laminated magnetic core carrying main and auxiliary windings 73, 74 outwardly from a rotor receiving bore 76. The rotatable assembly, like the first embodiment, has a laminated rotor core accommodating a cast squirrel-cage secondary winding having conductors electrically joined at least at each core end face 21, 22 by continuous end rings 23, 24. The rotor is secured to revolve with shaft 17 by a key and interference fit connection 77.

In establishing the axial positions on the shaft of thrust transmitting members 27, 28, which are cast from aluminum material, the hub terminations 34 of the members are axially spaced from a pair of standard snap rings 78, 79 accommodated in suitably provided circumferential shaft grooves 81, 82 furnished a selected axial distance therebetween as dictated by the size and configuration of the motor components. Members 27, 28, like before, have a tight fit with the shaft. It should be noted at this time that in both embodiments, the first axial position on shaft 17 of members 27, 28 is established and the means for determining the position removed before the end frames are secured to the stationary assembly. This is particularly desirable for the motor of the second embodiment in view of the inaccessibility of the rotatable assembly when the components have been assembled together. Further, in both embodiments, positive stops (e.g., rigidly fixed end face 22 and snap rings 78, 79) are employed to define the second positions of the members. Consequently, under these circumstances, it is desirable that the fit between members 27, 28 and shaft 17 be sufficiently tight for the members to revolve with the shaft without the tendency to oscillate or otherwise move from the final location. In addition, the fit should be such that it prevents axial movement away from the first position during securement of the end frames to the stator as axial bias is applied to the frames (e.g., resulting from spring 57 of fixture 56 in the exemplification).

Returning to the space on each side of the core in FIGURE 8 between the snap rings and associated thrust member, the space is equal to approximately half of the total end play desired for the motor, the space being pre-set at any time prior to the assembly of end frames 87, 88 onto the shaft in the manner revealed in FIGURE 8. These end frames or end shield assemblies are constructed in accordance with the disclosure of the L. W. Wightman Patent 3,008,777. Thus, they each include a cup-shaped member 89 stamped from sheet material, such as steel, a bearing reservoir 91 and a sleeve type bearing 92 of the porous sintered type having the inboard end furnished with a thrust receiving radial wall 93 and the outboard end 94 staked or otherwise secured to member 89.

The motor components when assembled as shown in FIGURE 8 have basically the same established interrelationships as those already explained in connection with FIGURE 4 for the first embodiment except in regard to the exact axial positions of members 27, 28. It should be noted that like the first embodiment, adjacent thrust walls 33, 93 are held in biased engaging relation as support fixture 56 pivotally supports end frames 87, 88 for individual movement in the two directions as the bearing bores in turn support the combined weight of the stator 72, rotatable assembly, and three shims 96 (FIGURE 9) which fasten the stator and rotatable assembly together in a fixed relation. These shims extend through suitable ventilation holes 97 furnished in end frame members 89. It should additionally be noted that knife edges 62, 63 are in engagement with the outer periphery of reservoir 91 of the respective end frames 77, 88 inside the motor rather than the bearings in order to support the frames.

After material 70 has been hardened and shims 96 removed from the air gap defined between stator bore 76 and outer surface 26 of the rotor, as already discussed for the first embodiment, the axial positions of the thrust members 27, 28 are then changed so that their hub terminations 34 engage the associated snap ring 78, 79. This change of position may readily be accomplished by merely tapping alternately on each end of the shaft by an impact element 98 (e.g., rubber mallet or the like) illustrated in FIGURE 10 with a force exceeding that existing pressure between the shaft and thrust members 27, 28. For example, tapping the left side of the shaft in the direction indicated by the arrow in FIGURE 10 will cause the shaft to move axially relative to thrust member 28 as end frame 88 serves to prevent axial movement of that member. The other member 27 may be transferred in a similar way against ring 78 by the application of a force to shaft 17 in the direction of the broken lined arrow. Consequently, FIGURES 8–10 include the same advantageous features already enumerated in regard to FIGURES 1–7 inclusive.

It should be apparent to those skilled in the art, while we have shown and described what at present are considered to be the preferred embodiments of our invention in accordance with the Patent Statutes, changes may be made in the structure and method disclosed without actually departing from the true spirit and scope of this invention, and we therefore intend to cover in the following claims all such equivalent variations as fall within the invention.

What we claim as new and desire to secure by Letters Patent of the United States is:

1. A method of manufacturing an electric motor including a stationary assembly including a stator core, a rotatable assembly having a magnetic core secured to revolve with a shaft, and thrust transmitting means located on either side of the core, and a pair of journal bearing means each formed with a bearing bore rotatably supporting the assemblies for relative rotation, the method comprising the steps of: fastening the assemblies in a fixed predetermined relation with one thrust transmitting means facing away from either side face of the core of the rotatable assembly in spaced relation therewith at a first preselected axial position; sliding the journal bearing means onto associated shaft journals and holding the journal bearing means toward the associated thrust transmitting means; securing each of said journal bearing means and said stationary assembly together as both of said journal bearing means are being maintained toward the associated thrust transmitting means at said first preselected axial position; and releasing said stationary and rotatable assemblies for relative rotation, and changing at least one of said thrust transmitting means from said first to a second preselected axial position located nearer said magnetic core of the rotatable assembly than the first to provide the desired total end play for the rotatable assembly in the motor.

2. A method of manufacturing an electric motor including a stationary assembly including a stator core, a rotatable assembly having a magnetic core secured to revolve with a shaft, and thrust transmitting means located on either side of the core, and a pair of journal bearing means each formed with a bearing bore rotatably supporting the assemblies for relative rotation, the method comprising the steps of: holding the assemblies in a fixed relation, with one thrust transmitting means facing away from either side face of the core of the rotatable assembly in spaced relation therewith at a preselected axial position related to the desired end play to be built into the motor; sliding the journal bearing means onto associated shaft journals and biasing the journal bearing means toward the associated thrust transmitting means; pivotally supporting each journal bearing means independently for angular movement as the journal bearing means in turn primarily support the combined weight of the stationary and rotatable assemblies whereby at least the combined weight of said assemblies causes the bearing bores to pivot into alignment with the associated journal of the shaft; securing each of said journal bearing means and said stationary assembly together as both of said journal bearing means are being biased toward the associated thrust transmitting means they primarily carry the combined weight of said assemblies and as said preselected axial positions of said thrust transmitting means are being maintained at said preselected axial positions; and releasing said stationary and rotatable assemblies for relative rotation.

3. A method of manufacturing an electric motor including a stationary assembly including a stator core, a rotatable assembly having a magnetic core secured to revolve with a shaft, and a thrust transmitting means located on either side of the core, and a pair of journal bearing means each formed with a bore rotatably supporting the assemblies for relative rotative, the method comprising the steps of: fastening the assemblies in a fixed relation, with an air gap of predetermined dimensions being fixedly formed between the cores, and with one thrust transmitting means facing away from either side face of the core of the rotatable assembly in spaced relation therewith at a first preselected axial position relative to core; sliding the journal bearing means onto associated shaft journals and biasing the journal bearing means into engagement with the associated thrust transmitting means; pivotally supporting each journal bearing means for angular movement in two separate directions, as the journal bearing means in turn support the combined weight of the stationary and rotatable assemblies whereby the combined weight of said assemblies causes the journal bearing means bores to pivot into alignment with the associated journal of the shaft; securing each of said journal bearing means and said stationary assembly together as both of said journal bearing means are being biased toward the associated thrust transmitting means while carrying the combined weight of said assemblies and as said preselected axial positions of said thrust transmitting means are being maintained at said preselected axial positions; releasing said stationary and rotatable assemblies for relative rotation; and changing at least one of said thrust transmitting means from the first to a second preselected axial position located nearer said magnetic core of the rotatable assembly than the first to provide the desired total end play for the rotatable assembly in the motor.

4. The method of claim 1 in which the axial distance between said first and second axial positions is equal to the total desired end play for the motor and the bearing bore terminates in a thrust receiving wall.

5. The method of claim 1 in which at least one of the thrust transmitting means at said first axial position comprises a thrust member carried by the shaft having a tight fit therewith, and the change to a second position is effected by tapping at least one end of the shaft.

6. The method of claim 2 in which each journal bearing means includes an end frame pivotally supported for independent pivotal movement in more than one direction relative to the axis of the shaft as the bearing bores pivot into alignment with the associated shaft journal and the end frames are secured to the stationary assembly by adhesive material which neither disturbs the pivotal action of the end frames nor the motor component relationships previously established.

References Cited
UNITED STATES PATENTS

| | | | |
|---|---|---|---|
| 3,038,765 | 6/1962 | Tupper | 310—90 X |
| 2,423,750 | 12/1947 | Benson. | |
| 2,958,908 | 11/1960 | Thompson et al. | |
| 3,020,105 | 2/1962 | Thompson et al. | |
| 3,165,816 | 1/1965 | Thompson et al. | |
| 3,172,197 | 3/1965 | Rutledge. | |
| 3,176,172 | 3/1965 | Thompson et al. | |
| 3,176,380 | 4/1965 | Wightman. | |
| 3,195,222 | 7/1965 | Rutledge. | |

JOHN F. CAMPBELL, *Primary Examiner.*

C. E. HALL, *Assistant Examiner.*